(12) United States Patent
Kim et al.

(10) Patent No.: US 8,980,082 B2
(45) Date of Patent: Mar. 17, 2015

(54) METHOD OF SIMULTANEOUSLY REMOVING SULFUR AND MERCURY FROM HYDROCARBON MATERIAL USING CATALYST BY MEANS OF HYDROTREATING REACTION

(75) Inventors: Do Kyoung Kim, Daejeon (KR); Do Woan Kim, Daejeon (KR); Sang Il Lee, Daejeon (KR); Seung Hoon Oh, Seoul (KR); Woo Kyung Kim, Incheon (KR); Han Seung Pan, Incheon (KR); Woo Young Kim, Incheon (KR); Kyung Soo Jun, Incheon (KR); Sun Choi, Daejeon (KR)

(73) Assignees: SK Innovation Co., Ltd., Seoul (KR); SK Energy Co., Ltd., Seoul (KR)

( * ) Notice: Subject to any disclaimer, the term of this patent is extended or adjusted under 35 U.S.C. 154(b) by 0 days.

(21) Appl. No.: 13/984,412

(22) PCT Filed: Feb. 8, 2012

(86) PCT No.: PCT/KR2012/000923
§ 371 (c)(1),
(2), (4) Date: Aug. 8, 2013

(87) PCT Pub. No.: WO2012/108686
PCT Pub. Date: Aug. 16, 2012

(65) Prior Publication Data
US 2013/0313165 A1   Nov. 28, 2013

(30) Foreign Application Priority Data
Feb. 9, 2011   (KR) .................. 10-2011-0011454

(51) Int. Cl.
| | | |
|---|---|---|
| C10G 45/00 | (2006.01) | |
| C10G 45/08 | (2006.01) | |
| B01J 23/882 | (2006.01) | |
| B01J 37/20 | (2006.01) | |
| C10L 3/10 | (2006.01) | |
| C10G 25/00 | (2006.01) | |
| C10G 45/04 | (2006.01) | |
| B01J 23/883 | (2006.01) | |
| C10G 45/38 | (2006.01) | |
| C10G 49/00 | (2006.01) | |
| C10G 49/04 | (2006.01) | |
| C10G 49/20 | (2006.01) | |
| C10G 61/06 | (2006.01) | |
| B01J 37/18 | (2006.01) | |

(Continued)

(52) U.S. Cl.
CPC .................. *C10G 45/08* (2013.01); *B01J 21/04* (2013.01); *B01J 23/882* (2013.01); *B01J 37/20* (2013.01); *C10L 3/101* (2013.01); *C10L 3/103* (2013.01); *C10G 25/003* (2013.01); *C10G 45/04* (2013.01); *C10G 2300/202* (2013.01); *C10G 2300/205* (2013.01); *C10G 2300/207* (2013.01); *B01J 23/883* (2013.01); *C10G 45/38* (2013.01); *C10G 49/005* (2013.01); *C10G 49/04* (2013.01); *C10G 49/20* (2013.01); *C10G 61/06* (2013.01); *C10G 2300/1025* (2013.01); *C10G 2300/1029* (2013.01); *C10G 2300/104* (2013.01); *C10G 2300/1044* (2013.01); *C10G 2300/4006* (2013.01); *B01J 37/18* (2013.01); *B01J 23/28* (2013.01); *B01J 23/30* (2013.01); *B01J 23/75* (2013.01); *B01J 23/755* (2013.01); *B01J 23/888* (2013.01); *B01J 35/023* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 35/1061* (2013.01)
USPC ...................................................... 208/208 R

(58) Field of Classification Search
CPC ........ C10G 67/06; C10G 45/08; C10G 45/04; C10G 25/003; C10G 2300/207; C10G 2300/205; C10G 2300/202; B01J 23/882; B01J 37/20; B01J 21/04; C10L 3/103; C10L 3/101
USPC ...................................................... 208/251 H
See application file for complete search history.

(56) References Cited

U.S. PATENT DOCUMENTS 4,814,152 A * 3/1989 Yan .............................. 423/210
4,911,825 A * 3/1990 Roussel et al. ............ 208/251 R
(Continued)

FOREIGN PATENT DOCUMENTS

| | | |
|---|---|---|
| CN | 1045596 A | 9/1990 |
| KR | 10-0251426 B1 | 4/2000 |

(Continued)

OTHER PUBLICATIONS

WIPO 2012/108686 A3, Aug. 16, 2012, International Search Report, International Application No. PCT/KR2012/000923, "Method of Simultaneously Removing Sulfur and Mercury from Hydrocarbon Material using Catalyst by Means of Hydrotreating Reaction."

(Continued)

*Primary Examiner* — Randy Boyer
*Assistant Examiner* — Juan Valencia
(74) *Attorney, Agent, or Firm* — Bracewell & Giuliani LLP; Brad Y. Chin

(57) ABSTRACT

Disclosed herein is a method of simultaneously removing sulfur and mercury from a hydrocarbon material, including: hydrotreating the hydrocarbon material containing sulfur and mercury in the presence of a catalyst including a metal supported with a carrier to convert sulfur into hydrogen sulfide, and adsorb mercury on a metal active site or a carrier of the catalyst in the form of mercury sulfide.

12 Claims, No Drawings

(51) Int. Cl.
  *B01J 23/28*  (2006.01)
  *B01J 23/30*  (2006.01)
  *B01J 23/75*  (2006.01)
  *B01J 23/755* (2006.01)
  *B01J 23/888* (2006.01)
  *B01J 21/04*   (2006.01)
  *B01J 35/02*   (2006.01)
  *B01J 35/10*   (2006.01)

(56) References Cited

U.S. PATENT DOCUMENTS 5,601,701 A * 2/1997 Cameron et al. .......... 208/251 H
7,993,513 B2 * 8/2011 Picard et al. .................. 208/253

FOREIGN PATENT DOCUMENTS

| KR | 10-0284222 B1 | 5/2001 |
| KR | 10-2002-0068391 A | 8/2002 |
| KR | 10-2009-0051174 A | 5/2009 |

OTHER PUBLICATIONS

Xiangsheng Wang; Research Development of Mercury Removal Technologies for Natural Gas and Hydrocarbon Oils; Journal of Chemical Industry & Engineering, Jun. 2010, vol. 31, No. 3; 4 pgs.
CN 201280007589.7 Office Action dated May 19, 2014; 10 pgs.

* cited by examiner

METHOD OF SIMULTANEOUSLY REMOVING SULFUR AND MERCURY FROM HYDROCARBON MATERIAL USING CATALYST BY MEANS OF HYDROTREATING REACTION

RELATED APPLICATIONS

This application is related to, and claims priority to, PCT Patent Application No. PCT/KR2012/000923, filed on Feb. 8, 2012, which claims priority to Korean Patent Application Serial No. 10-2011-0011454, filed on Feb. 9, 2011, the disclosure of which is incorporated herein by reference in its entirety.

BACKGROUND

1. Field of the Invention

The present invention relates to a method of simultaneously removing sulfur and mercury from a hydrocarbon material using a catalyst by means of a hydrotreating reaction.

2. Description of Related Art

Hydrocarbon materials, such as crude oil, natural gas and natural gas condensate as well as the gas, light naphtha, heavy naphtha, kerosene, light gas oil (LGO), heavy gas oil (HGO), atmospheric oil residues and the like produced therefrom, contain various amounts of sulfur, mercury, and sulfur and/or mercury compounds according to the origin and kind of material.

Damage, such as air pollution, acid rain and the like, may result when sulfur included in the hydrocarbon material is discharged into the air. Since sulfur poisons a cracking catalyst and a reforming catalyst in a large majority of petrochemical processes, sulfur must be removed before carrying out the petrochemical process. Particularly, since a reforming catalyst (a precious metal catalyst) is very sensitive to sulfur, the amount of sulfur included in a feed in a reforming process is generally limited to less than 1 ppm. For this reason, in order to remove sulfur from hydrocarbon, sulfur is reacted with hydrogen in the presence of a catalyst under a hydrogen atmosphere at high temperature and high pressure to be converted into hydrogen sulfide, which is then separated from the hydrocarbon using a separator.

Meanwhile, when mercury included in the hydrocarbon material is discharged into the air, environment and safety problems may be caused even if only a small amount of mercury is discharged. Further, when mercury comes into contact with a catalyst in a petrochemical process, mercury acts as a catalyst poisoning material, inactivating the catalyst, thereby damaging the petrochemical process. Particularly, since a reforming catalyst (a precious metal catalyst) is very sensitive to mercury, the amount of mercury included in a feed in a reforming process is generally limited to less than 1 ppb. For this reason, various methods for removing mercury from a hydrocarbon material have been developed.

Conventionally, there has been used a method of removing mercury, comprising the steps of: reacting hydrogen with a raw material containing mercury in the presence of a catalyst at a relatively high temperature; and trapping mercury from the reaction product using a trapping agent at a relatively low temperature. However, this method is problematic in that additional installation and operation costs are required because additional two-step processes must be conducted in order to remove mercury.

SUMMARY

In a conventional process of removing sulfur from a hydrocarbon material containing sulfur and mercury, when sulfur and mercury are simultaneously removed in one step by adsorbing mercury on a metal active site or carrier of a catalyst in the form of mercury sulfide, sulfur and mercury can be easily and cheaply removed from the hydrocarbon material without conducting an additional mercury removing process. Based on this finding, the present invention was completed.

An aspect of the present invention provides a method of simultaneously removing sulfur and mercury from a hydrocarbon material, including: hydrotreating the hydrocarbon material containing sulfur and mercury in the presence of a catalyst including a metal supported with a carrier to convert sulfur into hydrogen sulfide, and adsorb mercury on a metal active site or a carrier of the catalyst in the form of mercury sulfide.

In the method, the hydrocarbon material may be at least one selected from the group consisting of crude oil, natural gas and natural gas condensate; and gas, light naphtha, heavy naphtha, kerosene, light gas oil (LGO), heavy gas oil (HGO) and atmospheric oil residue produced therefrom.

Further, the hydrocarbon material may be heavy naphtha having a boiling point of about 60° C.~180° C.

Further, the metal may be at least one selected from the group consisting of cobalt, molybdenum, nickel, tungsten, cobalt-molybdenum, nickel-molybdenum, nickel-tungsten, and cobalt-tungsten.

Further, the carrier may be at least one selected from the group consisting of alumina, active carbon, silica, silica-alumina, zirconia, and titania.

Further, the hydrotreating reaction may be conducted at 200° C.~400° C.

The method according to claim 1 may further include: adding a sulfur compound to the hydrocarbon material.

Here, the sulfur compound may be represented by the following Formula:

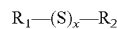

wherein X is an integer of 1~7, and $R_1$ and $R_2$ are each independently at least one selected from the group consisting of hydrogen, alkyl, alkenyl, alkynyl and aryl.

Further, the sulfur compound may be at least one selected from the group consisting of hydrogen sulfide, dimethylsulfide (DMS), dimethyldisulfide (DMDS), diethylsulfide (DES), diethyldisulfide (DEDS), and sour gas.

Further, the amount of the sulfur compound added to the hydrocarbon material may be 1 mg~10000 mg per 1 kg of the hydrocarbon material, based on sulfur atoms.

Further, the amount of the sulfur compound added to the hydrocarbon material may be 1 mg~3000 mg per 1 kg of the hydrocarbon material, based on sulfur atoms.

The method according to claim 1 may further include: providing an adsorbing material at a rear end of a reactor including the catalyst.

Here, the adsorbing material may be at least one selected from the group consisting of alumina, active carbon, silica, silica-alumina, zirconia, and titania.

According to the present invention, in a process of removing a sulfur compound from a hydrocarbon material containing sulfur and mercury, a sulfur compound and a mercury compound are simultaneously removed, and thus mercury can be easily and cheaply removed from the hydrocarbon material without conducting an additional mercury removing process.

Further, according to the present invention, in the case where a hydrocarbon material includes a relatively small amount (several ppm) of a sulfur compound, when a sulfur compound is added to the hydrocarbon material or a sour gas containing a sulfur compound is introduced into the hydrocarbon material, the content of a sulfur compound in the hydrocarbon material is increased, thereby removing mercury more efficiently.

DETAILED DESCRIPTION

Although the following detailed description contains many specific details for purposes of illustration, it is understood that one of ordinary skill in the relevant art will appreciate that many examples, variations, and alterations to the following details are within the scope and spirit of the invention. Accordingly, the exemplary embodiments of the invention described herein are set forth without any loss of generality, and without imposing limitations, relating to the claimed invention.

In the present specification, the meaning of sulfur includes sulfur and a sulfur compound, and the meaning of mercury includes mercury and a mercury compound.

Generally, in a sulfur removal process, a metal in a catalyst exists in form of a metal sulfide. In the present invention, in the presence of the sulfurized catalyst, sulfur included in a hydrocarbon material is converted into hydrogen sulfide, and mercury included in a hydrocarbon material is converted into metal mercury. This converted metal mercury reacts with metal sulfide active sites in the catalyst or hydrogen sulfide to be converted into mercury sulfide (HgS), and this mercury sulfide (HgS) can be adsorbed on the metal active sites of the catalyst or the carrier of the catalyst and then removed. Since such a reaction is continuously performed in the same catalyst layer, mercury can be removed together with sulfur in a general sulfur removal process. The mercury sulfide (HgS) adsorbed on the catalyst can influence the inactivation of the catalyst. However, since the amount of mercury in the hydrocarbon material is very small compared to the number of metal active sites in the catalyst, the mercury sulfide (HgS) does not greatly influence the inactivation of the catalyst.

According to an embodiment of the present invention, the hydrocarbon material containing sulfur and mercury may be at least one selected from the group consisting of crude oil, natural gas and natural gas condensate; and gas (C1~C4), light naphtha (C5~C6), heavy naphtha (C7~C12), kerosene (C12~C17), light gas oil (LGO, (C17~C26)), heavy gas oil (HGO) and atmospheric oil residue (C26 or more) produced therefrom. More concretely, heavy naphtha having a boiling point of about 60~180° C. may be used as the hydrocarbon material.

According to an embodiment of the present invention, in the catalyst used in the present invention, a carrier may support at least one metal selected from the group consisting of cobalt (Co), molybdenum (Mo), nickel (Ni), tungsten (W), cobalt-molybdenum (Co—Mo), nickel-molybdenum (Ni—Mo), nickel-tungsten (Ni—W), and cobalt-tungsten (Co—W). Here, in the case of metals such as cobalt (Co), molybdenum (Mo), nickel (Ni) and the like, various precursors thereof may be used. For example, ammonium heptamolybdate tetrahydrate (hereinafter, referred to as "AHM") may be used as a precursor of molybdenum (Mo), cobalt nitrate hexahydrate (hereinafter, referred to as "CNH") may be used as a precursor of cobalt (Co), and nickel nitrate hexahydrate (hereinafter, referred to as "NNH") may be used as a precursor of nickel (Ni). Further, the carrier may be at least one selected from the group consisting of alumina, active carbon, silica, silica-alumina, zirconia, and titania. More concretely, the carrier may have sufficient surface area, pore volume and average pore diameter to adsorb mercury sulfide and may have a BET surface area of 30 m²/g or more, preferably 100 m²/g~500 m²/g. Further, the carrier may have a pore volume of 0.3 ml/g or more, preferably 0.4 ml/g~1.2 ml/g, and may have an average pore diameter of 5 nm or more. The amount of the metal may be 1~80 wt %, preferably 5~60 wt %, and more preferably 10~40 wt % based on the total weight of the catalyst.

According to an embodiment of the present invention, the catalyst may be prepared by supporting an alumina carrier with 1~10 wt % of cobalt and 5~30 wt % of molybdenum based on the total weight of the catalyst.

Further, the catalyst may also be prepared by supporting an alumina carrier with 1~10 wt % of nickel and 5~30 wt % of molybdenum based on the total weight of the catalyst.

According to an embodiment of the present invention, the catalyst of the present invention may be activated by carrying out sulfurization before the reaction. The sulfurization of the catalyst may be conducted using a method of sulfurizing a catalyst while hydrotreating the catalyst containing a sulfur compound in a reactor or a method of sulfurizing a catalyst while reacting the catalyst with a sulfur compound or a raw material containing a sulfur compound, but is not limited thereto.

According to an embodiment of the present invention, in the hydrotreating reaction of the present invention, the reaction temperature may be 200~400° C., preferably 270~360° C., the hydrogen pressure may be 10~150 kg/cm², preferably 25~90 kg/cm², the liquid space velocity may be 0.3~12 hr⁻¹, and the flow rate of hydrogen per unit volume of the catalyst may be 5~500 vol/hr.

According to an embodiment of the present invention, such a hydrocarbon material as a natural gas condensate has a relatively high mercury compound content of several ppb, but has a relative low sulfur compound content of several ppm. Therefore, there may be cases in which the mercury in such a hydrocarbon material cannot be completely removed by the hydrogen sulfide made from the sulfur compound present in the hydrocarbon material. In this case, if a sulfur compound is added to the hydrocarbon material either directly or by circulating sour gas containing a sulfur compound, the amount of the sulfur compound in the hydrocarbon material can be increased, so that mercury can be removed more efficiently from the hydrocarbon material.

According to an embodiment of the present invention, the sulfur compound is represented by the following Formula:

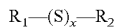

$$R_1-(S)_x-R_2$$

wherein X may be an integer of 1~7, and $R_1$ and $R_2$ may be each independently at least one selected from the group consisting of hydrogen, alkyl, alkenyl, alkynyl and aryl.

Further, the additionally-used sulfur compound may be at least one selected from the group consisting of hydrogen sulfide, dimethylsulfide (DMS), dimethyldisulfide (DMDS), diethylsulfide (DES), diethyldisulfide (DEDS), and sour gas.

According to an embodiment of the present invention, the amount of the additionally-used sulfur compound may be 1~10000 mg, preferably 1~3000 mg per 1 kg of the hydrocarbon material based on sulfur atoms. When this sulfur compound is additionally added to the hydrocarbon material, sulfur and mercury can be simultaneously removed from the hydrocarbon material in a one-step reaction.

According to an embodiment of the present invention, sulfur and mercury are respectively converted into hydrogen sulfide and metal mercury, and the converted metal mercury and the metal mercury included in the hydrocarbon material react with the metal sulfide active sites in the catalyst or hydrogen sulfide to be converted into mercury sulfide (HgS), and finally, the mercury sulfide (HgS) is adsorbed on the active sites or carrier of the catalyst. Here, in order to accelerate the adsorption of the mercury sulfide (HgS), an adsorbing material may be provided at the rear end of a reactor charged with the catalyst, thus adsorbing mercury from the hydrogen material more easily. The adsorbing material may be at least one selected from the group consisting of alumina, active carbon, silica, silica-alumina, zirconia and titania.

Hereinafter, the present invention will be described in more detail with reference to the following Preparation Examples and Examples. These Examples are set forth to illustrate the present invention, and the scope of the present invention should not be limited thereto.

PREPARATION EXAMPLE 1

Preparation of a CoMo/Al$_2$O$_3$ Catalyst

A CoMo/Al$_2$O$_3$ catalyst including about 10 wt % of molybdenum (Mo) and about 3 wt % of cobalt (Co) was prepared using a gamma-crystalline Al$_2$O$_3$ having a diameter of 1 mm, a surface area of 260 m$^2$/g, an average pore diameter of 10 nm and a total pore volume of about 0.83 ml/g as a carrier. In the preparation of the CoMo/Al$_2$O$_3$ catalyst, AHM, which is a precursor of Mo, and CNH, which is a precursor of Co, were used.

The CoMo/Al$_2$O$_3$ catalyst was prepared in the following order.

First, an Al$_2$O$_3$ carrier was impregnated with an aqueous solution prepared by dissolving AHM in distilled water, was dried at 150° C. for 2 hours, and was then continuously calcined at 500° C. for 2 hours to prepare a Mo/Al$_2$O$_3$ catalyst.

Subsequently, the Mo/Al$_2$O$_3$ catalyst is impregnated with an aqueous solution prepared by dissolving CNH in distilled water, was dried at 150° C. for 2 hours, and was then continuously calcined at 500° C. for 2 hours to prepare a CoMo/Al$_2$O$_3$ catalyst.

2.6 cc of the CoMo/Al$_2$O$_3$ catalyst prepared in this way was charged in a cylindrical reactor, and was then sulfurized at 400° C. for 5 hours while supplying a mixed gas including 10% of H$_2$S and 90% of H$_2$ at flow rate of 100 cc/min.

PREPARATION EXAMPLE 2

Preparation of a NiMo/Al$_2$O$_3$ Catalyst

A NiMo/Al$_2$O$_3$ catalyst including about 10 wt % of molybdenum (Mo) and about 3 wt % of nickel (Ni) was prepared using a gamma-crystalline Al$_2$O$_3$ having a diameter of 1 mm, a surface area of 260 m$^2$/g, an average pore diameter of 10 nm and a total pore volume of about 0.83 ml/g as a carrier. In the preparation of the NiMo/Al$_2$O$_3$ catalyst, AHM, which is a precursor of Mo, and NNH, which is a precursor of Ni, were used. The NiMo/Al$_2$O$_3$ catalyst was prepared and post-treated in the same manner as in Preparation Example 1, with the exception of the above-conditions.

EXAMPLES 1 to 4

Mercury Removal from Heavy Naphtha Depending on the Amount of Sulfur in Feed and Reaction Temperature Heavy naphtha, as a feed, was reacted with hydrogen at a feed flow rate of 0.26 cc/min (LHSV=5.1 hr$^{-1}$) using the CoMo/Al$_2$O$_3$ catalyst prepared in Preparation Example 1 under the conditions of a reaction pressure of 31 bar and a hydrogen flow rate of 60 cc/min. The heavy naphtha used in each of Examples 1 to 4 is a component having a boiling point of 60° C.~180° C. and was obtained from an atmospheric distillation tower during the fractionation of crude oil. In Example 1, the amount of sulfur in heavy naphtha was 3 ppm, and the amount of mercury in heavy naphtha was 2.9 ppb. However, in Example 2 to 4, the amounts of sulfur in heavy naphtha were 9 ppm, 188 ppm and 277 ppm, respectively. In Examples 2 to 4, in order to measure the degree of removing sulfur and mercury from heavy naphtha depending on the amount of sulfur in the heavy naphtha, dimethyldisulfide (DMDS) was mixed with the feed, and the amount thereof was adjusted. In order to measure the rate of converting sulfur from heavy naphtha and the rate of removing mercury from heavy naphtha depending on reaction temperatures, tests were carried out while changing the reaction temperature to 290° C., 310° C. and 330° C. Samples corresponding to the reaction temperatures were obtained every three days, and the sulfur conversion and mercury removal degree of the obtained samples were evaluated using a sulfur analyzer and a mercury analyzer, respectively, and the results thereof are given in Table 1 below.

TABLE 1

| | | Exp. 1 | Exp. 2 | Exp. 3 | Exp. 4 |
|---|---|---|---|---|---|
| | Amount of sulfur in feed (ppm) | 3 | 9 | 188 | 277 |
| | Amount of mercury in feed (ppb) | 2.9 | 2.9 | 2.9 | 2.9 |
| Reaction temperature | 290° C. sulfur content (ppm) | 1.18 | 1.11 | 0.93 | 3 |
| | sulfur conversion (%) | 62.7 | 87.7 | 99.5 | 98.9 |
| | mercury content (ppb) | 0 | 0 | 0 | 0 |
| | mercury removal degree (%) | 100 | 100 | 100 | 100 |
| | 310° C. sulfur content (ppm) | 0.67 | 1.70 | 0.95 | 2.18 |
| | sulfur conversion (%) | 78.8 | 81.1 | 99.5 | 99.2 |
| | mercury content (ppb) | 0 | 1.2 | 0 | 0 |
| | mercury removal degree (%) | 100 | 58.6 | 100 | 100 |
| | 330° C. sulfur content (ppm) | 1.32 | 1.71 | 1.16 | 1.5 |
| | sulfur conversion (%) | 58.2 | 81.0 | 99.4 | 99.5 |
| | mercury content (ppb) | 1.1 | 1.7 | 0 | 0 |
| | mercury removal degree (%) | 62.1 | 41.4 | 100 | 100 |

As given in Table 1 above, in Example 1, the sulfur removal degree using the CoMo/Al$_2$O$_3$ was about 58~79% depending on the reaction temperature. In order to observe whether or not the hydrogen sulfide (H$_2$S) produced by the reaction of the sulfur compound included in the feed with hydrogen was dissolved in the product, the sulfur components included in the product were analyzed using GC-SCD. As a result, it can be ascertained that most of the sulfur components included in the product exist in the form of hydrogen sulfide (H$_2$S), not in the form of unconverted sulfur components. Really, since hydrogen sulfide (H$_2$S) can be completely separated using a separator after the hydrogenation reaction, it can be seen that a larger amount of the sulfur compound was converted into hydrogen sulfide (H$_2$S) compared to the sulfur conversion given in Table 1 above. In Example 1, in the case of a feed including 3 ppm of a sulfur compound, mercury included in the feed in an amount of 2.9 ppb was completely removed at reaction temperatures of 290° C. and 310° C., but only 62% was removed at a reaction temperature of 330° C.

Referring to the results of Examples 2 to 4, it can be seen that the sulfur removal degrees were high even when the amounts of sulfur in the feed were 9 ppm, 188 ppm and 277 ppm, each of which is higher than 3 ppm. Moreover, as the result of analyzing the sulfur components included in the product using GC-SCD, from the fact that most of the sulfur components included in the product exist in the form of hydrogen sulfide (H$_2$S), not in the form of unconverted sulfur components or dimethyldisulfide (DMDS), it can be seen that a larger amount of sulfur compound was converted into hydrogen sulfide (H$_2$S) compared to the sulfur conversion given in Table 1 above.

Further, as in Examples 1 and 2, when a sulfur compound was included in the feed in a small amount of 3 ppm or 9 ppm, it can be seen that the mercury removal degree was decreased even at a relatively high temperature of 310° C. or 330° C. In contrast, when a sulfur compound was included in the feed in a relatively large amount of 188 ppm or 277 ppm, it can be seen that mercury was completely removed over the entire temperature range.

Blank Test

A blank test was carried out in order to ascertain the possibility of mercury being removed without the catalytic reaction, such as trapping mercury using a filter in a feed pump, attaching mercury to the wall of a reactor or the like. The blank test was carried out in the same manner as in Example 1, except that a catalyst did not exist in a reactor. As a result, it can be seen that the amount (3 ppm) of sulfur included in the heavy naphtha feed and the amount (2.9 ppb) of mercury included in the heavy naphtha feed did not change even after the reaction. This shows that the possibility of sulfur and mercury being removed by external factors other than the catalytic reaction can be excluded.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of simultaneously removing sulfur and mercury from a hydrocarbon material in a one-step reaction, the method comprising:
hydrotreating the hydrocarbon material containing sulfur and mercury in the presence of a single catalyst including a metal sulfide supported with a carrier, in which the sulfur and the mercury in the hydrocarbon material, respectively, are converted into hydrogen sulfide and metal mercury, and the converted metal mercury reacts with active sites of the metal sulfide in one of the single catalyst or the converted hydrogen sulfide to form mercury sulfide, and the formed mercury sulfide is absorbed on the active sites of one of the metal sulfide or the carrier of the single catalyst,
wherein the metal sulfide in the single catalyst is at least one selected from the group consisting of cobalt, molybdenum, nickel, tungsten, cobalt-molybdenum, nickel-molybdenum, nickel-tungsten, and cobalt-tungsten, and
wherein the hydrotreating reaction is conducted at about 270-400° C.

2. The method according to claim 1, wherein the hydrocarbon material is at least one selected from the group consisting of crude oil, natural gas and natural gas condensate; and gas, light naphtha, heavy naphtha, kerosene, light gas oil (LGO), heavy gas oil (HGO) and atmospheric oil residue produced therefrom.

3. The method according to claim 1, wherein the hydrocarbon material is heavy naphtha having a boiling point of 60° C.~180° C.

4. The method according to claim 1, wherein the carrier is at least one selected from the group consisting of alumina, active carbon, silica, silica-alumina, zirconia, and titania.

5. The method according to claim 1, wherein the hydrotreating reaction is conducted on a condition of a temperature of 270-36° C. a hydrogen pressure of 25-90 kg/cm$^2$, a liquid space velocity of 0.3-12 hr$^{-1}$, and a flow rate of hydrogen per unit volume of the single catalyst of 5-500 vol/hr.

6. The method according to claim 1, further comprising: adding a sulfur compound to the hydrocarbon material.

7. The method according to claim 6, wherein the sulfur compound is represented by the following Formula:

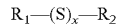

wherein X is an integer of 1~7, and R$_1$ and R$_2$ are each independently at least one selected from the group consisting of hydrogen, alkyl, alkenyl, alkynyl and aryl.

8. The method according to claim 6, wherein the sulfur compound is at least one selected from the group consisting of hydrogen sulfide, dimethylsulfide (DMS), dimethyldisulfide (DMDS), diethylsulfide (DES), diethyldisulfide (DEDS), and sour gas.

9. The method according to claim 6, wherein an amount of the sulfur compound added to the hydrocarbon material is 1 mg~10000 mg per 1 kg of the hydrocarbon material, based on sulfur atoms.

10. The method according to claim 6, wherein an amount of the sulfur compound added to the hydrocarbon material is 1 mg~3000 mg per 1 kg of the hydrocarbon material, based on sulfur atoms.

11. The method according to claim 1, wherein an adsorbing material is further provided at a rear end of a reactor including the single catalyst.

12. The method according to claim 11, wherein the adsorbing material is at least one selected from the group consisting of alumina, active carbon, silica, silica-alumina, zirconia, and titania.

* * * * *